Figure 1:
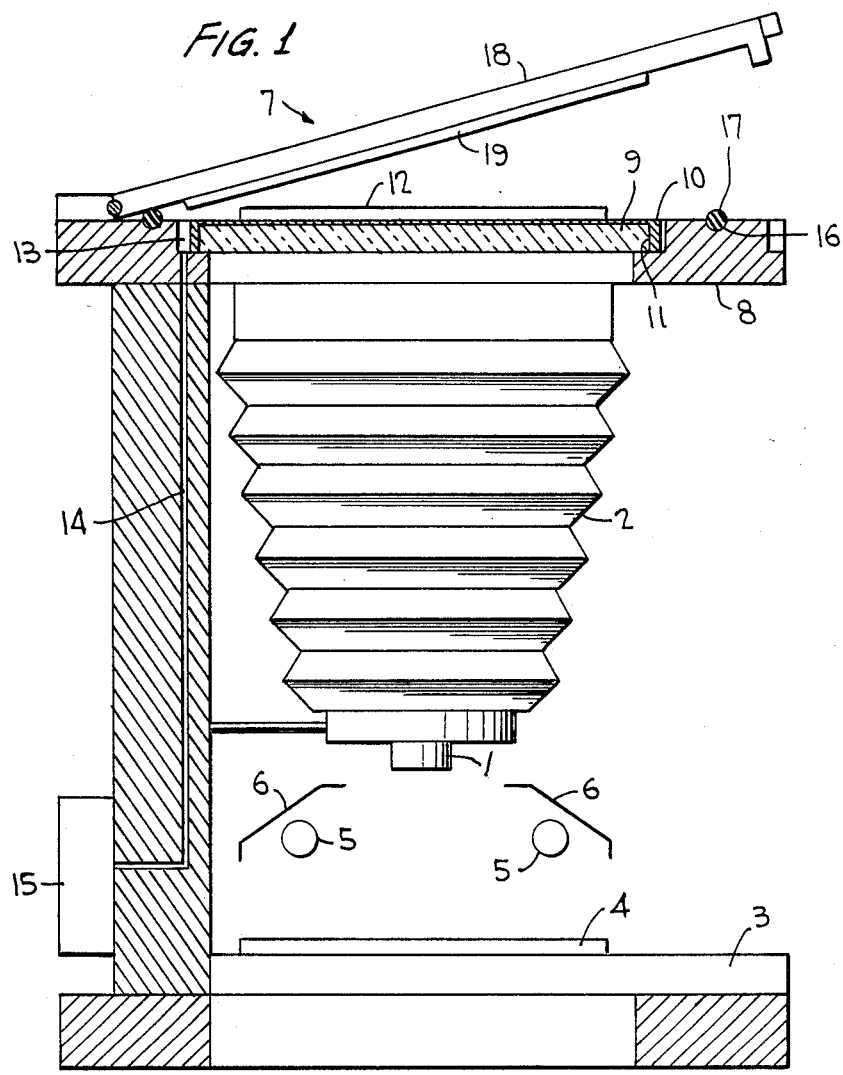

United States Patent [19]

Thiers

[11] Patent Number: 4,583,850
[45] Date of Patent: Apr. 22, 1986

[54] PHOTOGRAPHIC CAMERA AND ITS USE IN CONJUNCTION WITH PHOTOGRAPHIC SILVER HALIDE EMULSION MATERIALS

[75] Inventor: Christiaan G. Thiers, Schoten, Belgium

[73] Assignee: AGFA-Gevaert, N.V., Mortsel, Belgium

[21] Appl. No.: 586,833

[22] Filed: Mar. 6, 1984

[30] Foreign Application Priority Data

Mar. 18, 1983 [EP] European Pat. Off. ........ 83200374.3

[51] Int. Cl.⁴ ............................................. G03B 27/20
[52] U.S. Cl. ..................................................... 355/91
[58] Field of Search .............................. 355/73, 91–94, 355/87, 71

[56] References Cited

U.S. PATENT DOCUMENTS

| 3,634,009 | 1/1972 | Van Dusen | 355/73 X |
| 4,089,603 | 5/1978 | Jacobs | 355/91 X |
| 4,258,994 | 3/1981 | Task | 355/71 X |

Primary Examiner—Richard A. Wintercorn
Attorney, Agent, or Firm—A. W. Breiner

[57] ABSTRACT

A process camera including a lens or lens system movably mounted for focussing light with respect to a glass sheet serving as an image plane and a vacuum-operated frame back provided with a flexible blanket having a surface relief configuration on its contacting surface for holding by contact therewith a photographic material against the said glass sheet, characterized in that the edges of the glass sheet are provided with a material absorbing light to which the glass sheet is transparent.

4 Claims, 2 Drawing Figures

PHOTOGRAPHIC CAMERA AND ITS USE IN CONJUNCTION WITH PHOTOGRAPHIC SILVER HALIDE EMULSION MATERIALS

The present invention relates to an improved process camera and its use in conjunction with photographic silver halide emulsion materials.

A photographic camera is a device for making a record of an image or object by light passing through a lens or a lens system which focusses the light-image on an exposure surface plane containing or carrying the light-sensitive recording material. More particularly the present invention relates to an improved process camera, which is a camera especially designed for process work, that is copying, halftone making, colour separation and similar work. Such cameras are usually of large size, ruggedly constructed, and mounted so as to minimize vibration (ref. Graphic Arts Handbook and Products Manual—compiled and edited by George A. Stevenson, Published by Pen and Press Publications, Inc. 22419 Halldale Avenue, Torrance, California (1960) p. 233 and 255).

In the process camera the light sensitive material is kept flat between a glass plate serving as a transparent support and a light-tight vacuum-operated frame back exerting pressure on the photographic material. As a result of vacuum suction on the said frame, the photographic material, e.g. film, is held in close contact with the exposure surface, also called film plane, so that it is properly exposed over its whole surface. The vacuum-operated frame back is provided with a flexible blanket, e.g. rubber-impregnated fabric having surface relief configuration on its contacting surface forming small channels thorugh which air can be removed by suction whereby the blanket is held tightly against the transparent support carrying the photographic material. The surface relief configuration of the blanket is usually a rectangular grid pattern of crossing grooves from which air is drawn towards the edge of the vacuum frame connected to a vacuum pump.

A survey of photographic cameras including a glass sheet as image plane is given under the heading "Process Cameras" and "Gallery Camera" in the book: "Ilford Graphic Arts Manual" vol. 1, by H. M. Cartwright FR.P.S. - Ilford, Essex (1st reprint 1962) p. 82–87.

In a common exposure technique carried out in a process camera for obtaining a reverse-reading copy, the light-sensitive silver halide emulsion layer is laid in direct contact with the film plane being a glass plate. Reverse reading negative copies are applied in diffusion-transfer-reversal (DIR-) processing for producing on a non-photosensitive image-receiving material a right-reading positive copy of the original.

When during the exposure in the depressurized vacuum frame a sheet of glass is used as a film plane to keep the photographic material flat with the emulsion side directed towards the lens system of the camera, a problem is encountered on development of lightly exposed areas by the appearance of tiny black spots in the less exposed emulsion layer areas in areas corresponding to the relief configuration of the vacuum-frame blanket held against the photographic material. This phenomenon is particularly manifest when using a photographic material having its light-sensitive emulsion layer coated on a film resin support free from an anti-halation layer. Such photographic materials are used for example in copying through a film support as described in the United States Patent Specification No. 4 357 407 for the production of right-reading negative copies by DTR-processing. It is generally desirable that light-sensitive material should be capable of exposure in process cameras without the production of such spots.

It has now been found surprisingly that treatment of the edges of the glass sheet film plane in process cameras to prevent or reduce internal reflections from such edges mitigates the problem of spot developing as hereinbefore described.

As a possible explanation as to why such an effect is obtained, it is considered that the main surface of the photographic material, held by the blanket of the vacuum-frame back is in a differential degree of contact therewith being held more tightly in the areas corresponding to the relief pattern on the contacting surface of the blanket. In the areas corresponding to the vacuum channels of the blanket there is a tendency for the emulsion to lift slightly from the glass against which the photographic material is generally held thus creating a pattern of differential internal reflecting capacity of the glass plate corresponding to the relief pattern on the blanket.

In the areas corresponding to close contact with the relief areas, there is less tendency for light passing through the glass plate to be internally reflected back into the glass plate, and thus passes directly into the photographic emulsion. A pattern with modulated refractive index is formed since gelatin and the vacuum (or air under reduced pressure) do not have the same refractive index. Such results in modulated internal reflection of stray-light in the glass plate.

It is assumed that stray-light reflected back obliquely into the glass is repeatedly reflected between the front and rear surface of the glass, and on reaching the edges of the glass plate is internally reflected therefrom and continues to pass to and fro longitudinally within the glass plate. By causing the edges of the glass plate to be non-reflecting according to the invention the repeated longitudinal traversing of stray-light within the glass plate is prevented or reduced, thus preventing or reducing its build-up during exposure time.

The present invention thus provides a process camera including a lens or lens system movably mounted for focussing light with respect to a glass sheet serving as an image plane and a vacuum-operated frame back provided with a flexible blanket having a surface relief configuration on its contacting surface for holding by contact therewith a photographic material against the said glass sheet, characterised in that the edges of the glass sheet are provided with a material absorbing light to which the glass sheet is transparent.

According to a first embodiment the edges of the transparent glass sheet serving as film plane are blackened by sticking a tape thereto. According to another embodiment the edges are coated with a paint. Before applying the non-reflecting material, the edges of the glass sheet are preferably first treated by chemical attack or grinding to provide a better adherence to the opacifying material.

Figure 2:
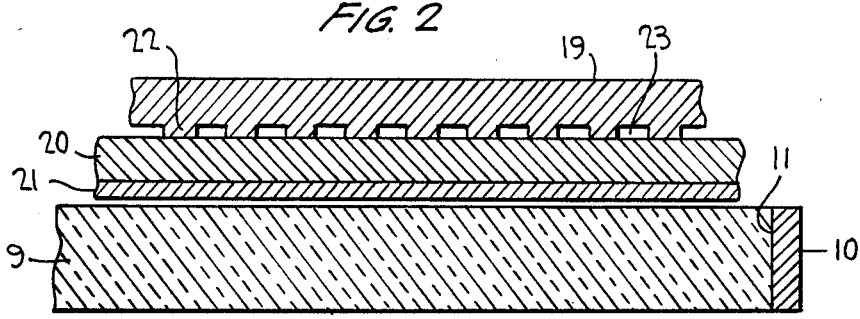

In the drawing, FIG. 1 illustrates a side view of a process camera including a glass sheet having opacified edge boundaries and serving as holder for photographic sheet material; and FIG. 2 illustrates a detailed sectional view of the glass sheet of FIG. 1 carrying a photographic silver halide emulsion film.

The process camera illustrated in FIG. 1 comprises a lens system 1 connected to a bellow 2 for vertical movement with respect to a copyboard 3 carrying a paper original 4. Paper original 4 is illuminated by exposure lamps 5 in reflectors 6. The process camera has a plate assembly 7 including a frame 8 supporting a rectangular glass sheet 9 having a coating 10 of black paint at its four edge boundaries 11. The glass sheet 9 serves as holder for a photographic silver halide film sheet material 12. The film material 12 makes contact with the glass sheet 9 through its silver halide emulsion layer 21 as best shown in FIG. 2. The glass sheet 9 is in an airtight manner secured in frame 8 having around the periphery of the glass sheet 9 a channel 13. Channel 13 is connected to a drain tubing 14 coupled to a vacuum pump 15.

A sealing gasket 17 of a flexible rubber is positioned in a semi-circular groove 16 and extends completely around frame 8 so as to form an airtight seal with hingedly fixed camera cover backplate 18. Camera cover plate 18 also has fixed thereto by an adhesive a flexible rubber blanket 19 having a surface relief structure as shown in FIG. 2.

FIG. 2 illustrates in detail a part of blanket 19 contacting resin film support 20 of the photographic material 12 having its emulsion layer 21 in direct contact with the glass sheet 9. The relief structure of blanket 19 comprises square relief portions 22 separated by crossing channels 23. These channels provide the necessary escape route for the air between the blanket 19 and the film support 20 on evacuating the camera cover space by the vacuum pump 15.

Although preference is given to a black colouration of the edges of the glass sheet e.g. by the use of black tape or paint, it has been established that mainly green light has to be absorbed since that kind of light is less absorbed by the glass itself which has a green appearance when seen edge on. Magenta colouration may be applied to the edges of the glass. As the treatment of the glass edges has to absorb substantially all the stray-light in the glass sheet, simple tests will shown which colour and optical density of the opacifying material to be used for the purpose of mitigating the described spot formation.

The glass sheet image plane with opacified edges has been successfully tested on a REPROMASTER 2001 vertical process camera. REPROMASTER is a trademark of Océ Helioprint (Denmark) for a vertical process camera. The described black spot phenomenon was observed by exposing a NPC-COPYPROOF orthochromatic film material with its emulsion side in contact with the glass image plane. COPYPROOF is a trademark of Agfa-Gevaert N.V. for silver complex diffusion transfer materials.

I claim:

1. A process camera including a lens or lens system movably mounted for focussing light with respect to a glass sheet serving as an image plane and a vacuum-operated frame back provided with a flexible blanket having a surface relief configuration on its contacting surface for holding by contact therewith a photographic material against the said glass sheet, characterised in that the edges of the glass sheet are provided with a material absorbing light to which the glass sheet is transparent.

2. A process camera according to claim 1, characterised in that the edges of the glass sheet are painted with a light-absorbing paint.

3. A process camera according to claim 1, characterised in that the edges of the glass sheet are coated with a light-absorbing adhesive tape.

4. A process camera according to claim 1, characterised in that the said material is a black material.

* * * * *